E. E. F. CREIGHTON.
MEANS FOR PROTECTING ELECTRIC SYSTEMS.
APPLICATION FILED AUG. 15, 1914.
1,273,744.
Patented July 23, 1918.
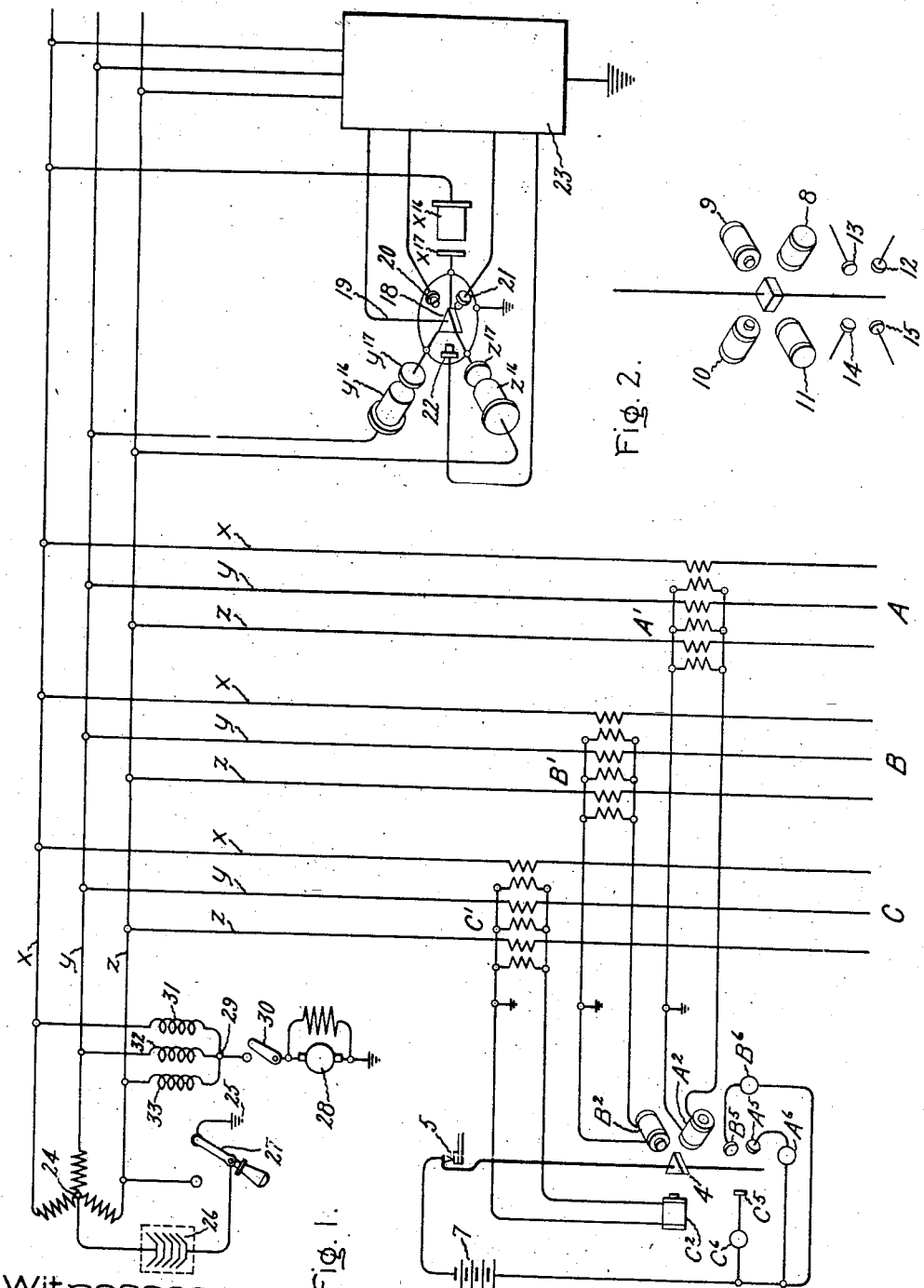
Witnesses:
Inventor:
Elmer E. F. Creighton,
by
His Attorney.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

MEANS FOR PROTECTING ELECTRIC SYSTEMS.

1,273,744.

Specification of Letters Patent.

Patented July 23, 1918.

Original application filed May 13, 1912, Serial No. 696,930. Divided and this application filed August 15, 1914. Serial No. 856,976.

*To all whom it may concern:*

Be it known that I, ELMER E. F. CREIGHTON, a citizen of the United States, residing at Schenectady, county of Schenectady, State of New York, have invented certain new and useful Improvements in Means for Protecting Electric Systems, of which the following is a specification.

The object of my invention is to give greater continuity of electrical service from transmission lines. The apparatus is particularly adapted to the conditions of multiple feeders that exist on nearly all large transmission systems.

My present application is a division of an application filed by me May 13, 1912, Serial No. 696,930, means for protecting electric systems, and relates particularly to the means for indicating the faulty feeder which is used in connection therewith.

In order properly to understand the function of the protective apparatus, it is necessary to review the class of troubles that cause interruptions of service on electric systems, and the nature of the troubles. Trouble sometimes occurs by reasons of faults in cables which, though they may then exist in an embryonic state, are not developed by the necessarily brief high potential tests before installation, but develop only after installation and more or less use. Aside from the faults which may exist at such tests, the methods of installing often introduce weak spots in the joints between the sections of the lines. These weak spots develop gradually into accidental grounds. Another source of weakness comes from electrolytic action on the sheaths of cables which finally bares the insulation to the deteriorating action of the surrounding elements. The production of these faults seems inevitable, although they can be minimized by careful work and selection of materials and rigid inspection. My invention is adapted to protect a system grounded by the development of any of such faults or grounds produced in any other way.

There are certain effects produced when any fault develops into a grounded phase. The electrostatic capacity of the whole system is suddenly unbalanced, and there is a continual variation in these relations due to the arc at the fault. The surges that are thereby created course around the system, building up high resonant voltages in certain localities and damaging the insulation in general by the brush discharge resulting from the high frequencies. During this time of arcing ground, the station attendant is helpless. He knows that there is trouble but has no means of locating or suppressing it without disconnecting the entire system, and thus interrupting service. With a continuance of such conditions, it almost invariably happens that apparatus and other cables are damaged. Finally, the arcing ground forms into a short circuit and then a more or less widespread interruption is caused by the operation of overload circuit breakers by the excessive currents which flow in the short circuit. Furthermore, great damage is liable to result to other lines in the neighborhood of the faulty one.

The apparatus which is herein described is designed to perform the following useful functions: First, to test the system to discover incipient faults in the insulation at a time of the day, night, or week most favorable to the system for such tests, for example, when the load is light and several spare feeders are available; second, within a small fraction of a second after the development of a fault, to locate on which one of the several feeders the fault has occurred and also to indicate the phase at fault; third, to suppress arcing grounds, and thus suppress all the dangerous surges which are thereby produced; fourth, to give an added protection to the most important piece of apparatus on a system, namely, the generator, during the brief interval that is necessary for the arcing ground suppressor to operate.

Up to the present, in the methods described for localizing faulty feeders, no account has been taken of the fact that the grounding currents on a system are seldom constant. Therefore, apparatus which is designed to operate or not operate according to the value of the grounding current becomes unreliable in actual practice. Some devices, if made sensitive, will produce false operations when the accidental currents to ground are heavy. If such devices are made non-sensitive, then the proper localizer will not operate when the ground is of such a nature as to take the minimum of current.

I have found by experimental tests that these grounding currents may easily vary in the ratio of ten to one.

Recognizing these conditions, the type of relay shown in the accompanying drawing has been designed to make the selection of the faulty feeder independent of the absolute value of a grounding current. This is done by balancing a force produced by the currents in one feeder against that produced in another feeder or other feeders. No matter what the conditions of arcing ground are, the relative increase of current in one feeder has a proportional increase in all the other feeders. However, if the forces engendered are caused to operate on a common element, the common element will move in the direction of the strongest force.

In the accompanying drawing, which forms a part of this specification, there is illustrated diagrammatically a system of distribution involving my invention. Figure 1 illustrates diagrammatically a system of distribution including a generator, bus bars and three feeders with apparatus involving my invention attached thereto. Fig. 2 illustrates diagrammatically parts of a localizer adapted for use with four feeders.

Before proceeding to describe the other parts of this system of protection, I shall describe more in detail the relations of the circuits to the localizer as they are shown in Fig. 1. In this description I shall designate the feeders as A, B and C, and shall follow this nomenclature through with corresponding numbers. The particular system illustrated is a three-phase system and the phases I shall designate as $x$, $y$ and $z$. $A^1$ is a three-phase transformer or a group of three single-phase current transformers, such as those used for instruments, the windings of which are so related and connected that no current is produced in the leads to the electromagnets, later described, under normal balanced operating conditions. $B^1$ is a corresponding group of current transformers on cable B, and $C^1$ for cable C. These transformers may be the standard instrument transformers also supplying the instruments, by which means it is possible to avoid the expense of special transformers. As far as the protective features are concerned, each group of transformers may be replaced by any transformer or group of transformers producing the desired results on the attached solenoids or electromagnets. By so connecting the current transformers, I obtain a resultant current from each feeder which is independent of load current no matter how unbalanced such load current may be. As long as the current coming out one phase returns over one or both of the other phases there will be no resultant current produced. One side of each of the secondary circuits may be grounded in order to give safety against shock. Each of the transformer circuits is connected to an electromagnet or solenoid in the manner indicated; these electromagnets are shown at $A^2$, $B^2$ and $C^2$. Since under normal conditions of operation the algebraic sum of the three currents in the three transformers on any feeder is equal to zero, no current under such conditions will pass through the electromagnets $A^2$, $B^2$ and $C^2$. When, however, a ground takes place in the system, the electrostatic currents in the transformers of these three phases become unbalanced and there is a resultant current in the electromagnets $A^2$, $B^2$ and $C^2$, the grounded feeder giving the greatest current. This will be explained in detail later. The three electromagnets $A^2$, $B^2$ and $C^2$ have their axes spaced 120° apart and point to a common center. At this common center an armature 4 is placed. This armature is mounted on a freely moving pendulum pivoted at the upper end at 5. Under this condition of design, no matter what the absolute values of the currents are in the electromagnets $A^2$, $B^2$ and $C^2$, the electromagnet giving the strongest pull will draw the armature in its direction. The apparatus, being arranged in this manner, is so independent of absolute values that it may be made as sensitive as desirable and is independent of the erratic changes in grounding current. These are the important features referred to above and are not applicable to a ground localizer alone but to localizers of various conditions.

It will, of course, be understood that it is essential that the solenoids produce equal stresses on the armature on the occurrence of a fault on the system elsewhere than on the feeders to which the solenoids are attached. This may be accomplished in various ways as by using different numbers of turns on the solenoids, differently positioning the solenoids relatively to the armature, using different numbers of turns on the transformer, etc. I prefer to construct the coils $A^2$, $B^2$ and $C^2$ with the numbers of turns therein inversely proportioned to the electrostatic capacity of the feeders to which they are respectively attached.

Prior to the occurrence of a ground, the electrostatic currents flowing on each feeder through its group of transformers balance and hence the transformers tend to send no current through the attached electromagnet. On the occurrence of a ground on one phase, however, that phase throughout the entire system assumes earth potential and there is no longer an equal exchange of charging current between the phases. In other words, the currents in the three phases on each feeder will be unbalanced, causing a difference of potential at the terminals of the transformers. In the feeder that is grounded, there is more unbalanced current than in any of the other feeders connected to the bus bars. It should be noted that the grounding current of all the non-grounded feeders has to flow into the bus bars through their respective transformers, and that all these currents combine and flow out through the transformer of the grounded feeder to the earth. This in itself produces a differentiation between the cables, i. e., a greater unbalancing in the grounded feeder than in any other. It is understood that the phenomena on grounding is not simple, but this short explanation of what I now believe takes place is sufficient for the purposes of this specification. Although the actual conditions existing at any instant are difficult to explain, there is no question about the result; all the groups of transformers are in the unbalanced condition, and the group on the grounded cable is the most unbalanced, with the result of a selection in the movement of the armature 4. The free moving pendulum is extended beyond the armature 4 so that in its movement toward an electromagnet it will engage with a local circuit contact which causes an indication by some sort of signal which feeder is grounded. The three local circuit contacts are numbered, corresponding to the electromagnets $A^5$, $B^5$ and $C^5$, and the signal indicators $A^6$, $B^6$ and $C^6$. The circuits for these indicators are completed through a battery or other source of electrical energy 7, and the suspension point 5. The signal devices $A^6$, $B^6$ and $C^6$ may be so arranged that when the signal is once made, it remains even after the contact at any one of the contacts $A^5$, $B^5$ or $C^5$ is broken. A simple device for this purpose is a drop indicator, although any other suitable indicator may be used. The devices $A^6$, $B^6$ and $C^6$ may, however, be relays in local circuits for operating more distant signals, switches or any other desired devices. Surges of short duration may occur on the system from various causes and the localizer should be so adjusted that while it will respond to a true ground, though an arcing one, it will not respond to these surges of short duration. In other words, a time element should be provided in the localizer. This time element may be brought in by a proper adjustment of the length of the pendulum and by the relative location of the magnets with reference to the armature 4. It will be understood that the adjustments should be such that while the localizer will not respond sufficiently to close the contacts $A^5$, $B^5$ and $C^5$ on the occurrence of transitory surges of short duration, such as course around the system at various times, due to switching, dropping load, etc., it will operate and close these contacts on the occurrence of a fault before the arcing ground suppressor can ground the system.

I have now described how my novel localizer or selective device operates on a system of distribution comprising three feeders. This type of localizer is especially applicable to systems of distribution comprising radial feeders, that is feeders that are only connected to a common point or station at one end. When more feeders are used, for example four, the arrangement of the coils for localizing the ground is shown in Fig. 2. It will be seen in this case that the oppositely placed electromagnets, such as 8 and 10, will cancel each other's effect entirely if the forces are equal, and assuming the feeder connected to either electromagnet 9 or 11 is grounded, there will be a resultant force in the direction of the electromagnet corresponding to the grounded feeder. There are four contacts 12, 13, 14 and 15, corresponding to the electromagnets, and having the same physical relation thereto as already described with reference to Fig. 1. It will be understood from this how my system of balancing out currents may apply to more than four feeders. The function then of the localizer is to instantly show which feeder is at fault.

We now come to the suppressor of the arcing ground which is first formed on the development of a fault. An arcing ground produces surging on the system and hence it is necessary to eradicate the arc as soon as possible. Any device which eradicates the arc by dead grounding, or otherwise, is broadly suitable, but I prefer to use the device shown diagrammatically in Fig. 1, which forms the subject matter of my prior applications, Serial No. 492,846 and No. 597,405. The particular device illustrated has already been described in detail in my application, Serial No. 597,405, and I will, therefore, here confine myself simply to the principle of its operation. There are two parts to this device: first, a phase selecting relay; second, three single phase switches capable of connecting any one phase to ground either temporarily (opening the ground after a certain period of time if the arc is extinguished) or permanently, if the arc occurs again or is persisting. The phase selecting relay may be either electromagnetically operated as disclosed in my preceding application Ser. No. 492,846 or electrostatically operated, but, for purposes of illustration, that shown in Fig. 1 is operated electrostatically. There are three fixed electrostatic plates $x^{16}$, $y^{16}$ and $z^{16}$. These plates exert a force on movable plates $x^{17}$, $y^{17}$ and $z^{17}$. The three movable plates are attached to a common center, 18, which is a part of a pendulum supported at some point, as 19. When the forces between the electrostatic plates of one phase weaken by grounding, the other two phases are strengthened relatively and drag the contactor 18 over against one of the three contacts 20, 21 or 22 to indicate the phase of the system grounded. Closing this contact also operates one of three phase switches all of which are inclosed with their accompanying mechanism at 23. Closing the proper switch makes a dead ground between the grounded phase and earth, and thus extinguishes the accidental arc which has occurred on that phase at some unknown point on the system and prevents destructive surging. Since this suppressor is on the bus bars, it relieves the armature 4 of the localizer but the signal or other mechanism on the corresponding feeder having already responded gives an indication of the faulty feeder.

I have now described the method of localizing the fault and the method of suppressing it, and I will next describe the combination of apparatus for giving protection against the surges which occur during the brief time required for the operation of the suppressor. This apparatus includes an electrolytic cell or cells 26 connected between the neutral 24 of the generator and the ground 25. The cell may be an aluminum one similar to those used as lightning arresters but no series gap is required. It is well known in the art that grounding the neutral of a system gives a great relief to the static strains in the system. If, however, this neutral is grounded through no resistance, then every ground on the line results in a short circuit, and an interruption of service. This is intrinsically an objectionable condition. If the neutral is grounded through a high resistance, then the protective value is very greatly lost by the obstruction of the oscillating currents in the resistance. This application of the electrolytic cell to the neutral gives all the advantages of the grounded system in absorbing abnormal potentials, and at the same time has none of the disadvantages of short circuits that occur with the neutral grounded through no resistance. Since it is the natural characteristic of the aluminum film to become dissolved in its electrolyte, it is necessary to supply a charging device as shown by the switch 27 for renewing the film from time to time. I have now added to the system of protection a device for absorbing the surges during the brief intervals of time that these surges take place.

I now turn to the device for the development of the incipient fault, which device may coöperate with the other devices to develop a fault at a time when no great embarrassment will be caused and when it may be readily corrected. This device consists of some sort of a direct current source 28, as a generator or a rectifier, which produces a DC potential which is superimposed on the AC potential waves on the system. This source 28 is connected between ground and some neutral point of the system by means of the switch 30. This neutral of the system may be an artificial one 29 produced by a combination of three reactances 31, 32 and 33 connected to the respective phases $x$, $y$ and $z$, or may be the neutral of the generator. The idea of measuring resistance by this means, I am aware, is well known in the art, but the use of such a direct current generator to aid in producing the proper potential to strain the insulation for test is, I believe, novel. The impression of this direct current on the system requires very little energy and combines with the alternating currents from the generator to produce the high potentials required. It is a well known fact that any piece of insulation can stand a greater direct current potential than it can alternating potential. Therefore, the testing of such a system when it is dead, by direct current, is not an adequate test, but the imposition of the direct current potential on the system when operating under alternating currents has the advantages of an alternating current test. Such tests may be made by alternating currents but such testing requires not only a very large kilovolt-ampere capacity in the testing device but also engenders possible combinations with the alternating current of the system to give variable voltages, and combinations with the electrostatic capacities to give resonance, both of which are objectionable. The system I propose takes advantage of the alternating current furnished by the generator to give the effects on the insulation of alternating currents and at the same time requires very little energy from the superimposed direct current potential from the generator 28. This developer of faults then completes the system for the preservation of continuity of electric service.

The attachment of the protective features to the system provides constant protection for faults which may develop at any time; the combination therewith of the testing means I regard as a desirable feature, since by this means, as has been before intimated, the system may be tested out at some time when there is but little demand being made upon it, and any faults which are near the point of development, developed at that time. The development of a fault under test causes the operation of the protecting devices, and thus protects the system against the injury which it might sustain the same as though the fault developed naturally. If necessary, the faulty feeder may be cut out and other provision made for supplying the portion of the load normally supplied by that feeder, before the demand can become great. The fault may even be located and the feeder repaired before its service is again required.

What I claim as new, and desire to secure by Letters Patent of the United States, is:—

1. The combination with a system of distribution including a plurality of feeders, of solenoids so connected to the feeders as to receive current therefrom only under abnormal conditions on the feeders, means to be actuated on the occurrence of such abnormal conditions, a local circuit for each of said means, and an armature controlled by said solenoids for closing the proper circuit, the solenoids and armature being so constructed and related that similar abnormalities in the feeders produce stresses by the solenoids on the armature inversely proportional to the electrostatic capacities of the feeders.

2. The combination with a system of distribution including three or more feeders, of means to be actuated on the occurrence of abnormal conditions on any of said feeders, an armature for controlling the actuation of said means, and means connected to each of said feeders and energized thereby, said armature being under the joint control of those last mentioned means attached to a sound and a faulty feeder; said means being so constructed and related as to produce equal stresses on the armature on the occurrence of abnormalities in the feeders due to a fault elsewhere than thereon.

3. The combination with a system of distribution including three or more feeders, of means to be actuated on the occurrence of abnormal conditions on any of said feeders, mechanism for actuating said means, and means connected to each of said feeders and energized thereby, said actuating mechanism being under the joint control of the last mentioned means, said last mentioned means being so constructed and related to the actuating mechanism as to balance each other and produce no movement thereof on the production of equal stresses by said means, and to produce equal stresses on the occurrence of a fault elsewhere than on the feeders to which they are attached.

4. The combination with a system of distribution including three or more feeders, of indicating means to be actuated on the occurrence of abnormal conditions on any of said feeders, mechanism for actuating said means, and means connected to each of said feeders and energized thereby, said actuating mechanism being under the joint control of the last mentioned means, said last mentioned means being so constructed and related to the actuating mechanism as to balance each other and produce no movement thereof on the production of equal stresses thereon by said means, and to produce equal stresses on said mechanism on the occurrence of a fault elsewhere than on the feeders to which they are attached.

5. The combination with a system of distribution including three or more feeders, of means to be actuated on the occurrence of abnormal conditions on any of said feeders, mechanism for actuating said means, and means connected to each of said feeders and energized thereby, said actuating mechanism being under the joint control of the last mentioned means, said last mentioned means being so constructed and related to the actuating mechanism that those attached to healthy feeders balance each other and allow movement of the mechanism responsive to the action of the means attached to the faulty feeder.

6. The combination with a system of distribution including three or more feeders, of means to be actuated on the occurrence of abnormal conditions on any of said feeders, mechanism in common for actuating said means, and means connected to each of said feeders and energized thereby, said actuating mechanism being under the joint control of the last mentioned means, said last mentioned means being so constructed and related to the actuating mechanism that those producing equal stresses thereon balance each other and allow movement of the mechanism responsive to the action of the means producing thereon a different stress.

7. The combination with a system of distribution including three or more feeders, of transformers operatively related thereto, a solenoid for each feeder connected to the transformers, the transformer windings being so connected and related as to deliver no current to the solenoids under normal operating conditions of the feeders and an armature, the solenoids being spaced at equal angular distances from each other about said armature.

8. The combination with a system of distribution including three or more feeders, of transformers operatively related thereto, a solenoid for each feeder connected to the transformers, the transformer windings being so connected and related as to deliver no current to the solenoids under the normally balanced condition of the feeders, and an armature, the solenoids being spaced at equal angular distances from each other about said armature.

9. The combination with a system of distribution including a plurality of feeders, of transformers operatively related thereto, a solenoid for each feeder connected to the transformers, the transformer windings being so connected and related as to deliver no current to the solenoids under the normally balanced condition of feeders, and an armature, the solenoids being spaced at equal angular distances from each other thereabout, and being so constructed and related to the armature as to produce thereon on the occurrence of equal currents in the solenoids, stresses which bear a relation to each other inversely proportional to the electrostatic capacity of their respective feeders.

10. The combination with a system of distribution including a plurality of feeders, of transformers attached thereto, a solenoid for each feeder connected to the transformers, the transformer windings being so connected and related as to deliver no current to the solenoids under the normally balanced condition of the feeders, and an armature, the solenoids being spaced at equal angular distances from each other thereabout, the number of turns on the solenoids being inversely proportional to the electrostatic capacity of their respective feeders.

11. The combination with a system of distribution including three or more feeders, of an indicator for each feeder, a differentially operated member controlling the operation of said indicators, and electroresponsive means for each feeder operative in response to the unbalanced current flowing when any one of said feeders is grounded for selectively actuating said member to cause the operation of that indicator corresponding to the feeder having the greatest unbalanced current.

12. The combination with a system of distribution including three or more feeders, of means selectively actuated on the occurrence of a fault, and separate means for each feeder energized in response to charging current flowing when one of said feeders is grounded said separate means all acting on the first mentioned means.

13. The combination with a system of distribution comprising three or more feeders, of a localizer of a fault comprising differential means responsive to the unbalanced electrostatic charging current of said feeder due to the occurrence of the fault for selectively indicating the faulty feeder.

14. A device for selectively indicating a grounded feeder on a system of distribution having three or more feeders, comprising means actuated in response to the resultant current of each feeder, an indicator operated in response to each of said means, and means differentially operated by said first mentioned means corresponding to the feeder grounded.

15. A localizer of a ground on a system of distribution having three or more feeders, comprising an electroresponsive device energized in response to the resultant current in each feeder, an indicator corresponding to each feeder, and a common member differentially movable in response to said electroresponsive devices to operate that indicator corresponding to the feeder having the greatest resultant current.

16. A localizer of a ground on a system of distribution having a plurality of feeders comprising a device for each feeder operated in response to the resultant current in its respective feeder, means differentially controlled by said devices, an indicator for each device operative in response to said means to indicate the feeder grounded, and means whereby said devices are compensated for the difference in the electrostatic capacity of their respective feeders.

17. A localizer of a ground on a system of distribution having three or more feeders, comprising an electroresponsive device energized in response to the resultant current in each feeder, a member differentially movable by said devices to assume a position corresponding to the feeder having the greatest unbalanced current, and indicators operative in response to the movement of said member to maintain an indication of the position of said member after said member has returned to its initial position.

In witness whereof, I have hereunto set my hand this 14th day of August, 1914.

ELMER E. F. CREIGHTON.

Witnesses:
  BENJAMIN B. HULL,
  HELEN ORFORD.